(12) United States Patent
Bansal et al.

(10) Patent No.: US 11,477,182 B2
(45) Date of Patent: Oct. 18, 2022

(54) CREATING A CREDENTIAL DYNAMICALLY FOR A KEY MANAGEMENT PROTOCOL

(71) Applicant: International Business Machines Corporation, Armonk, NY (US)

(72) Inventors: Rinkesh I. Bansal, Pune (IN); Mohit Niranjan Agrawal, Kothrud (IN); Prashant V. Mestri, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 16/405,538

(22) Filed: May 7, 2019

(65) Prior Publication Data

US 2020/0358751 A1 Nov. 12, 2020

(51) Int. Cl.
*H04L 9/40* (2022.01)
*H04L 9/14* (2006.01)
*H04L 9/08* (2006.01)

(52) U.S. Cl.
CPC ............ *H04L 63/065* (2013.01); *H04L 9/083* (2013.01); *H04L 9/14* (2013.01); *H04L 63/061* (2013.01); *H04L 63/0823* (2013.01)

(58) Field of Classification Search
CPC ....... H04L 9/08; H04L 9/0816; H04L 9/0819; H04L 9/083; H04L 63/06; H04L 63/061; H04L 63/065; H04L 63/08; H04L 63/0823
See application file for complete search history.

(56) References Cited

U.S. PATENT DOCUMENTS

| | | | |
|---|---|---|---|
| 7,870,389 B1 * | 1/2011 | Leung | H04L 9/16 713/153 |
| 8,078,705 B2 * | 12/2011 | Modi | H04L 63/065 709/212 |
| 8,295,490 B1 * | 10/2012 | McCoy | G06F 21/6218 380/279 |
| 8,798,273 B2 * | 8/2014 | Rich | H04L 63/0823 380/278 |
| 9,026,805 B2 | 5/2015 | Acar et al. | |
| 9,160,705 B2 * | 10/2015 | Laubner | H04L 63/00 |
| 10,007,809 B1 * | 6/2018 | Douglis | H04L 9/0894 |
| 10,063,372 B1 * | 8/2018 | Chiu | H04L 9/0894 |
| 2003/0086570 A1 * | 5/2003 | Riedel | H04L 9/088 380/277 |
| 2004/0268124 A1 * | 12/2004 | Narayanan | H04L 63/102 713/164 |
| 2007/0006296 A1 * | 1/2007 | Nakhjiri | H04L 63/0272 726/15 |

(Continued)

*Primary Examiner* — Khang Do
(74) *Attorney, Agent, or Firm* — Jeffrey S. LaBaw; David H. Judson

(57) ABSTRACT

A key management protocol (such as KMIP) is extended to provide an extended credential type that enables an initiating (first) client device to create a credential dynamically and that can then be selectively shared with and used by other (second) client devices. Using a dynamically-created credential of this type, the other (second) devices are able to fetch the same key configured by the initiating (first) device. In this manner, multiple devices are able to create and share one or more keys among themselves dynamically, and on as-needed basis without requiring a human administrator to create a credential for a device group in advance of its usage.

18 Claims, 13 Drawing Sheets

(56) References Cited

U.S. PATENT DOCUMENTS

| | | | |
|---|---|---|---|
| 2007/0079384 A1* | 4/2007 | Grinstein | G06F 21/629 713/165 |
| 2008/0120374 A1* | 5/2008 | Kawa | H04L 12/185 709/204 |
| 2013/0044878 A1* | 2/2013 | Rich | H04L 9/083 380/277 |
| 2013/0044882 A1* | 2/2013 | Rich | H04L 9/0833 380/279 |
| 2013/0318347 A1* | 11/2013 | Moffat | H04L 63/0435 713/168 |
| 2014/0219445 A1* | 8/2014 | Lee | H04L 9/0894 380/46 |
| 2014/0226820 A1* | 8/2014 | Chopra | H04L 63/0457 380/277 |
| 2014/0259090 A1* | 9/2014 | Ingersoll | H04L 63/20 726/1 |
| 2015/0180656 A1* | 6/2015 | Rich | H04L 9/0891 713/168 |
| 2015/0222604 A1* | 8/2015 | Ylonen | H04L 9/14 713/171 |
| 2015/0281187 A1* | 10/2015 | Ogura | H04L 9/3247 713/171 |
| 2016/0352516 A1* | 12/2016 | Oberheide | H04L 9/0897 |
| 2017/0012951 A1* | 1/2017 | Mennes | H04L 63/06 |
| 2017/0099153 A1* | 4/2017 | Watsen | H04L 9/3265 |
| 2017/0126406 A1 | 5/2017 | Reddy et al. | |
| 2017/0250799 A1* | 8/2017 | Stueve | H04L 9/0861 |
| 2019/0044929 A1* | 2/2019 | Kashyap | H04L 9/088 |
| 2019/0068591 A1* | 2/2019 | Zhang | H04L 9/0869 |
| 2020/0195434 A1* | 6/2020 | Bereza Júnior | H04L 9/0894 |
| 2020/0218826 A1* | 7/2020 | Nohara | G09C 1/00 |
| 2020/0274698 A1* | 8/2020 | Sun | H04L 9/14 |

* cited by examiner

HEADER: ~502
- PROTOCOL VERSION
- MAXIMUM RESPONSE SIZE (OPTIONAL, IN REQUEST)
- TIME STAMP (OPTIONAL IN REQUEST, REQUIRED IN RESPONSE)
- AUTHENTICATION (OPTIONAL)
- ASYNCHRONOUS INDICATOR (OPTIONAL, IN REQUEST, NO SUPPORT FOR ASYNCHRONOUS RESPONSE IS DEFAULT)
- ASYNCHRONOUS CORRELATION VALUE (OPTIONAL, IN RESPONSE). USED LATER ON FOR ASYNCHRONOUS POLLING
- RESULT STATUS: SUCCESS, PENDING, UNDONE, FAILURE (REQUIRED, IN RESPONSE)
- RESULT REASON (REQUIRED IN RESPONSE IF FAILURE, OPTIONAL OTHERWISE)
- RESULT MESSAGE (OPTIONAL, IN RESPONSE)
- BATCH ORDER OPTION (OPTIONAL, IN REQUEST, IN-ORDER PROCESSING IS DEFAULT). SUPPORT AT SERVER IS OPTIONAL
- BATCH ERROR CONTINUATION OPTION: UNDO, STOP, CONTINUE. STOP (OPTIONAL, IN REQUEST, STOP IS DEFAULT). SUPPORT AT SERVER IS OPTIONAL
- BATCH COUNT

BATCH ITEM: ~504
- OPERATION (ENUMERATION)
- UNIQUE MESSAGE ID (REQUIRED IF MORE THAN ONE BATCH ITEM IN MESSAGE)
- PAYLOAD (THE ACTUAL OPERATION REQUEST OR RESPONSE)
- MESSAGE EXTENSION (OPTIONAL, FOR VENDOR-SPECIFIC EXTENSIONS)

```
__ #define TAG_DEVICE_METADATA                0x540001
__ #define TAG_DEVICE_METADATA_VERSION        0x540002
__ #define TAG_DEVICE_METADATA_SERIAL_NUMBER  0x540003
__ #define TAG_DEVICE_METADATA_DEVICE_GROUP   0x540004
__ #define TAG_DEVICE_METADATA_DEVICE_TEXT    0x540005
__ #define TAG_DEVICE_METADATA_MACHINE_ID     0x540006
__ #define TAG_DEVICE_METADATA_MEDIA_ID       0x540007
__ #define TAG_DEVICE_METADATA_WORLDWIDE_NAME 0x540008
__ #define TAG_DEVICE_METADATA_MACHINE_TEXT   0x540009
```

FIG. 7

- ○ Tag: 0x420078 (Request Message), Type: 0x01 (Structure), Value:
- ● Tag: 0x420077 (Request Header), Type: 0x01 (Structure), Value: <<<THE BOLD PART IS THE REQUEST HEADER>>> ← 802
- ● Tag: 0x420069 (Protocol Version), Type: 0x01 (Structure), Value:
- ● Tag: 0x42006A (Protocol Version Major), Type: 0x02 (Integer), Value: 0x00000001 (1)
- ● Tag: 0x42006B (Protocol Version Minor), Type: 0x02 (Integer), Value: 0x00000000 (0)
- ● Tag: 0x42000C (Authentication), Type: 0x01 (Structure), Value:
- ● Tag: 0x420023 (Credential), Type: 0x01 (Structure), Value: ← 802
- ● Tag: 0x420024 (Credential Type), Type: 0x05 (Enumeration), Value: 0x80000001 (-2147483647) <<<EXTENDED CREDENTIAL TYPE!>>>
- ● Tag: 0x420025 (Credential Value), Type: 0x08 (Octet String), Value: <<< VALUE OF EXTENDED CREDENTIAL ! >>>
  **0x5400010100000040540003070000000C3030313233343536373839300000000000540004070000000095453
  54444556475250000000000000** ← 803
- ○ Tag: 0x420010 (Batch Order Option), Type: 0x06 (Boolean), Value:TRUE
- ○ Tag: 0x42000D (Batch Count), Type: 0x02 (Integer), Value: 0x00000002 (2)
- ○ Tag: 0x42000F (Batch Item), Type: 0x01 (Structure), Value: <<< BATCH ITEM #1 >>> ← 804
- ○ Tag: 0x42005C (Operation), Type: 0x05 (Enumeration), Value: 0x00000013 (19) <<< REVOKE OPERATION >>>
- ○ Tag: 0x420093 (Unique Batch Item ID), Type: 0x08 (Octet String), Value: 0x01
- ○ Tag: 0x420079 (Request Payload), Type: 0x01 (Structure), Value:
- ○ Tag: 0x420094 (Unique Identifier), Type: 0x07 (Text String), Value: KEY-d96df4fa-8246-41a0-bf18-c05e7605a6c7
- ○ Tag: 0x420081 (Revocation Reason), Type: 0x01 (Structure), Value:
- ○ Tag: 0x420082 (Revocation Reason Code), Type: 0x05 (Enumeration), Value: 0x00000006 (6)
- ○ Tag: 0x42000F (Batch Item), Type: 0x01 (Structure), Value: <<<Batch Item #2 >>> ← 804
- ○ Tag: 0x42005C (Operation), Type: 0x05 (Enumeration), Value: 0x00000014 (20) <<<DESTROY OPERATION>>>
- ○ Tag: 0x420093 (Unique Batch Item ID), Type: 0x08 (Octet string), Value: 0x02
- ○ Tag: 0x420079 (Request Payload), Type: 0x01 (Structure), Value:
- ○ Tag: 0x420094 (Unique Identifier), Type: 0x07 (Text String), Value: KEY-d96df4fa-8246-41a0-bf18-c05e7605a6c7

FIG. 8

```xml
<?xml version="1.0" encoding="UTF-8"?>
<RequestMessage>
    <RequestHeader>
            <ProtocolVersion>
            <ProtocolVersionMajor type="Integer" value="1" / >
            <ProtocolVersionMinor type="Integer" value="4" / >
            </ProtocolVersion>
            <Authentication>
                <Credential>
                    <CredentialType type="Enumeration" value="0x80000001" / >
                    <CredentialValue type="ByteString" value="54000101000000705400020200000004000000010000000054000407000000075032505F4558540054000A070000000C504545525F544F5F5045455200000000540008070000002E3335333303341333033353341333033373341333633333341333033383341343634363341343333353341333433430000"/>
                </Credential>
            </Authentication>
            <BatchCount type="Integer" value= "1" / >
        </RequestHeader>
            <BatchItem>
            <Operation type="Enumeration" value="Create"/>
                <RequestPayload>
                    <ObjectType type="Enumeration" value="SymmetricKey"/>
                        <TemplateAttribute>
                            <Attribute>
                            <AttributeName type="TextString" value= "Cryptographic Algorithm"/>
                            <AttributeValue type="Enumeration" value="AES"/>
                            </Attribute>
                            <Attribute>
                            <AttributeName type="TextString" value="Cryptographic Length"/>
                            <AttributeValue type="Integer" value="256"/>
                            </Attribute>
                            <Attribute>
                            <AttributeName type="TextString" value="Cryptographic Usage Mask"/>
                            <AttributeValue type="Integer" value="Decrypt Encrypt"/>
                            </Attribute>
                        <Attribute>
                          <AttributeName type="TextString" value="x-ID"/>
                          <AttributeValue type="TextString" value=Key2nd"/>
                          </Attribute>
                        </TemplateAttribute>
                </RequestPayload>
            </BatchItem>
</RequestMessage>
```

FIG. 11

```xml
<?xml version="1.0" encoding="UTF-8"?><ResponseMessage>
  <ResponseHeader>
    <ProtocolVersion>
        <ProtocolVersionMajor type="Integer" value="1" / >
        <ProtocolVersionMinor type="Integer" value="4" / >
    </ProtocolVersion>
    <TimesStamp type="DateTime" value="2018-09-24T10:02:28Z"/>
    <BatchCount type="Integer" value="1"/>
  </ResponseHeader>
  <BatchItem>
      <Operation type="Enumeration" value="Create"/>
      <ResultStatus type="Enumeration" value="Success"/>
      <ResponsePayload>
          <ObjectType type="Enumeration" value="SymmetricKey"/>
          <UniqueIdentifier type="TextString" value="KEY-..."/>
          <TemplateAttribute>
            <Attribute>
              <AttributeName type="TextString" value="Digest"/>
              <AttributeValue>
                  <HashingAlgorithm type= "Enumeration" value="SHA_256"/>
                  <DigestValue type= "ByteString" value="9612A4A797751BA0A18FB1465BB1404517CCA67D2372DE554145176606304A1"/>
                  <KeyFormalType type="Enumeration" value="Raw"/>
              </AttributeValue>
            </Attribute>
          </TemplateAttribute>
      </ReponsePayload>
    </BatchItem>
</ResponseMessage>
```

FIG. 12

```
<RequestMessage>
   <RequestHeader>
      <ProtocolVersion>
        <ProtocolVersionMajor type="Integer" value="1"/>
        <ProtocolVersionMinor type="Integer" value="1"/>
      </ProtocolVersion>
         <Authentication>
            <Credential>
               <CredentialType type="Enumeration" value= "0x80000001"/>
               <CredentialValue type="ByteString"
value="5400010100000385400020200000004000000010000000054000407000000075032505F455
8540054000A070000000C504545525F544F5F5045455200000000"/>
            </Credential>
         </Authentication>
           <BatchCount type="Integer" value= "1"/>
   </RequestHeader>
   </BatchItem>
        <Operation type="Enumeration" value="Locate"/>
        <RequestPayload>
           <UniqueIdentifier type="TextString" value="KEY- ..."/>
        </RequestPayload>
     </BatchItem>
  </RequestMessage>
```

FIG. 13

```
<ResponseMessage>
      <ResponseHeader>
      <ProtocolVersion>
      <ProtocolVersionMajor type="Integer" value= "1"/>
      <ProtocolVersionMinor type="Integer" value="3"/>
      </ProtocolVersion>
      <TimeStamp type="DateTime" value="2018-09-25T09:40:51Z"/>
      <BatchCount type="Integer" value="1"/>
</ResponseHeader>
<BatchItem>
       <Operation type="Enumeration" value="Locate"/>
       <ResultStatus type="Enumeration" value="Success"/>
       <ResponsePayload>
       <LocatedItems type= "Integer" value="1"/>
       <UniqueIdentifier type="TextString" value="KEY-..."/>
       </ResponsePayload>
       </BatchItem>
</ResponseMessage>
```

FIG. 14

```
<RequestMessage>
   <RequestHeader>
      <ProtocolVersion>
         <ProtocolVersionMajor type="Integer" value="1"/>
         <ProtocolVersionMinor type="Integer" value="1"/>
      </ProtocolVersion>
         <Authentication>
             <Credential>
                    <CredentialType type="Enumeration" value= "0x80000001"/>
                    <CredentialValue type="ByteString" value"
54000101000000205400020200000004000000010000000054000407000000075032505F45585400"/>
             </Credential>
          </Authentication>
          <BatchCount type= "Integer" value="1"/>
      </RequestHeader>
      <BatchItem>
         <Operation type="Enumeration" value="Locate"/>
         <RequestPayload>
             <UniqueIdentifier type="TextString" value= "KEY-..."/>
         </RequestPayload>
      </BatchItem>
   </RequestMessage>
```

FIG. 15

```
<ResponseMessage>
      <ResponseHeader>
      <ProtocolVersion>
      <ProtocolVersionMajor type="Integer" value= "1"/>
      <ProtocolVersionMinor type="Integer" value="3"/>
      </ProtocolVersion>
      <TimeStamp type="DateTime" value="2018-09-25T09:40:51Z"/>
      <BatchCount type="Integer" value="1"/>
</ResponseHeader>
<BatchItem>
      <Operation type="Enumeration" value="Locate"/>
      <ResultStatus type="Enumeration" value="Success"/>
      <ResponsePayload>
      <LocatedItems type= "Integer" value="1"/>
      <UniqueIdentifier type="TextString" value="KEY-..."/>
      </ResponsePayload>
      </BatchItem>
</ResponseMessage>
```

FIG. 16

CREATING A CREDENTIAL DYNAMICALLY FOR A KEY MANAGEMENT PROTOCOL

BACKGROUND OF THE INVENTION

Technical Field

This disclosure relates generally to cryptographic key lifecycle management.

Background of the Related Art

Business data is growing at exponential rates, and along with that growth is a demand for securing that data. Enterprises have responded by implementing encryption at various layers, such as in hardware, on the network, and in various applications. This response has resulted in a series of encryption silos, some of which hold confidential customer data, with fragmented approaches to security, keys and coverage. Further, different applications across the enterprise often employ different encryption methods. Thus, for example, some departments in the organization may use public-key cryptography while others use secret-key or hashes. Still others do not encrypt data while it is at rest (such as when it is stored on a device or in a database) but only when the data is in motion, using virtual private networks (VPNs) to secure the data pipeline. Key management for these encryption approaches is often similarly fragmented. Sometimes key management is carried out by department teams using manual processes or embedded encryption tools. Other times, the key management function is centrally managed and executed. In some cases, no formal key management process is in place. This fragmented approach to key management can leave the door open for loss or breach of sensitive data.

Key Management Interoperability Protocol (KMIP) is a known standard for key management sponsored by the Organization for the Advancement of Structured Information Standards (OASIS). It is designed as a comprehensive protocol for communication between enterprise key management servers and cryptographic clients (e.g., from a simple automated device to a sophisticated data storage system). By consolidating key management in a single key management system that is KMIP-compliant, an enterprise can reduce its operational and infrastructure costs while ensuring appropriate operational controls and governance of security policy.

KMIP is often implemented with an existing key management server architecture that is based on a centralized model, namely, one wherein clients are largely pre-provisioned with all of the cryptographic materials that they might need. This centralized model of this type accommodates a device-oriented support paradigm wherein the devices are sophisticated (e.g., storage devices) and have administrators responsible for their administration and management. KMIP, on the other hand, treats cryptographic clients uniformly and, more importantly, as entities that are intelligent and themselves capable of specifying cryptographic information, such as correct key sizes, encryption algorithms, and the like. The KMIP view of cryptographic clients is inconsistent with typical storage device types that today interact with enterprise key management servers. Indeed, such storage devices typically are better served with pre-provisioning support. As a consequence, there is an incompatibility between, on the one hand, the ability of existing key management servers to set up cryptographic attributes ahead of time, and, on the other hand, KMIP's theoretical support of otherwise highly-capable cryptographic clients that need no such pre-provisioning.

To address this issue, it is known to extend KMIP to provide an extended credential type to pass information from clients to the server to enable the server to deduce pre-provisioned cryptographic materials for the individual clients. In this type of approach, preferably KMIP client code communicates device information to a key management server in a value in the headers of KMIP requests that flow to the server. In this manner, KMIP requests are associated with pre-provisioned cryptographic materials for particular devices or device groups.

While the above approach works well for its intended purpose, key management protocols of this type (e.g., KMIP) only work with predefined credential types (e.g., base or extended). Some use cases, however, involve devices that requires dynamic creation of credentials. The technique of this disclosure addresses this need.

BRIEF SUMMARY

A key management protocol (such as KMIP) is extended to provide an extended credential type that enables an initiating (first) client device to create a credential dynamically and that can then be selectively shared with and used by other (second) client devices. Using a dynamically-created credential of this type, the other (second) devices are able to fetch the same key configured by the initiating (first) device. In this manner, multiple devices are able to create and share one or more keys among themselves dynamically, and on as-needed basis without requiring a human administrator to create a credential for a device group in advance of its usage. Preferably, the client request(s) are encoded within a KMIP request header structure.

In one embodiment, a method for authentication is implemented in a key management server computing entity. The method begins by extending a key management protocol (e.g., KMIP) to provide a credential type that enables a client-defined credential to be created dynamically. The key management server then receives a request to create a credential from a first client. The request is configured using the credential type. Upon authenticating the first client, key material for the first client is dynamically-provisioned. Upon a subsequent request received from a second client, the second client is enabled to access and use the key material dynamically provisioned for the first client.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the subject disclosure and the advantages thereof, reference is now made to the following descriptions taken in conjunction with the accompanying drawings, in which:

FIG. 5 illustrates a KMIP message format;

FIG. 7 illustrates an extended credential type;

FIG. 8 illustrates an example KMIP request that includes the extended credential;

FIG. 11 depicts a representative KMIP client request;

FIG. 12 depicts a representative KMIP response to the KMIP request in FIG. 11;

FIG. 13 depicts a representative KMIP client Locate request;

FIG. 14 depicts a representative KMIP response to the KMIP Locate request in FIG. 13;

FIG. 15 depicts another representative KMIP client request for an operation on a managed object of a device group; and FIG. 16 depicts a representative KMIP response to the request shown in FIG. 15.

DETAILED DESCRIPTION

Figure 1:
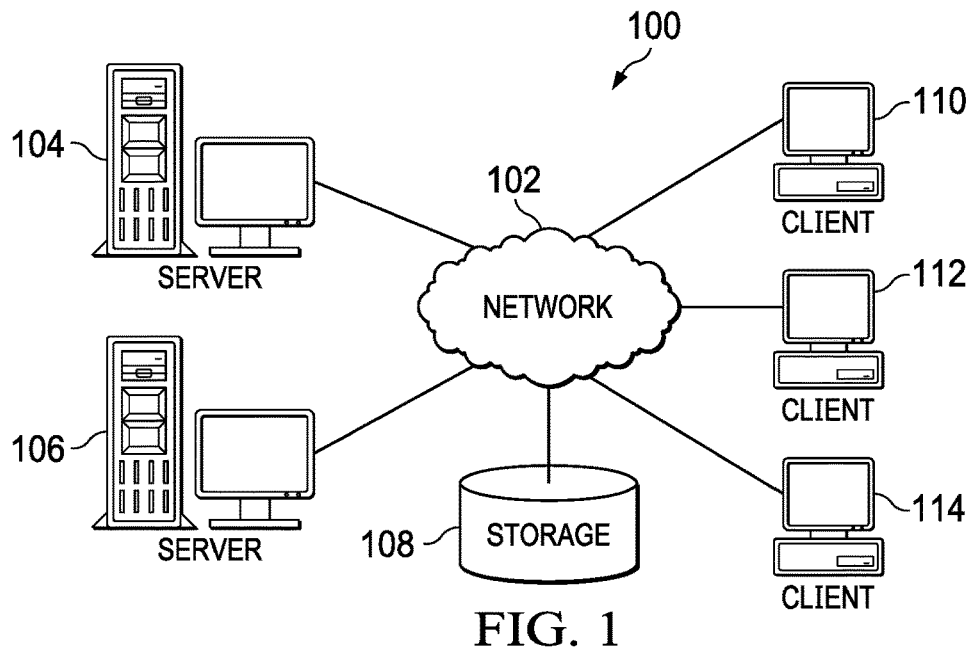
FIG. 1 depicts an exemplary block diagram of a distributed data processing environment in which exemplary aspects of the illustrative embodiments may be implemented.
Figure 2:
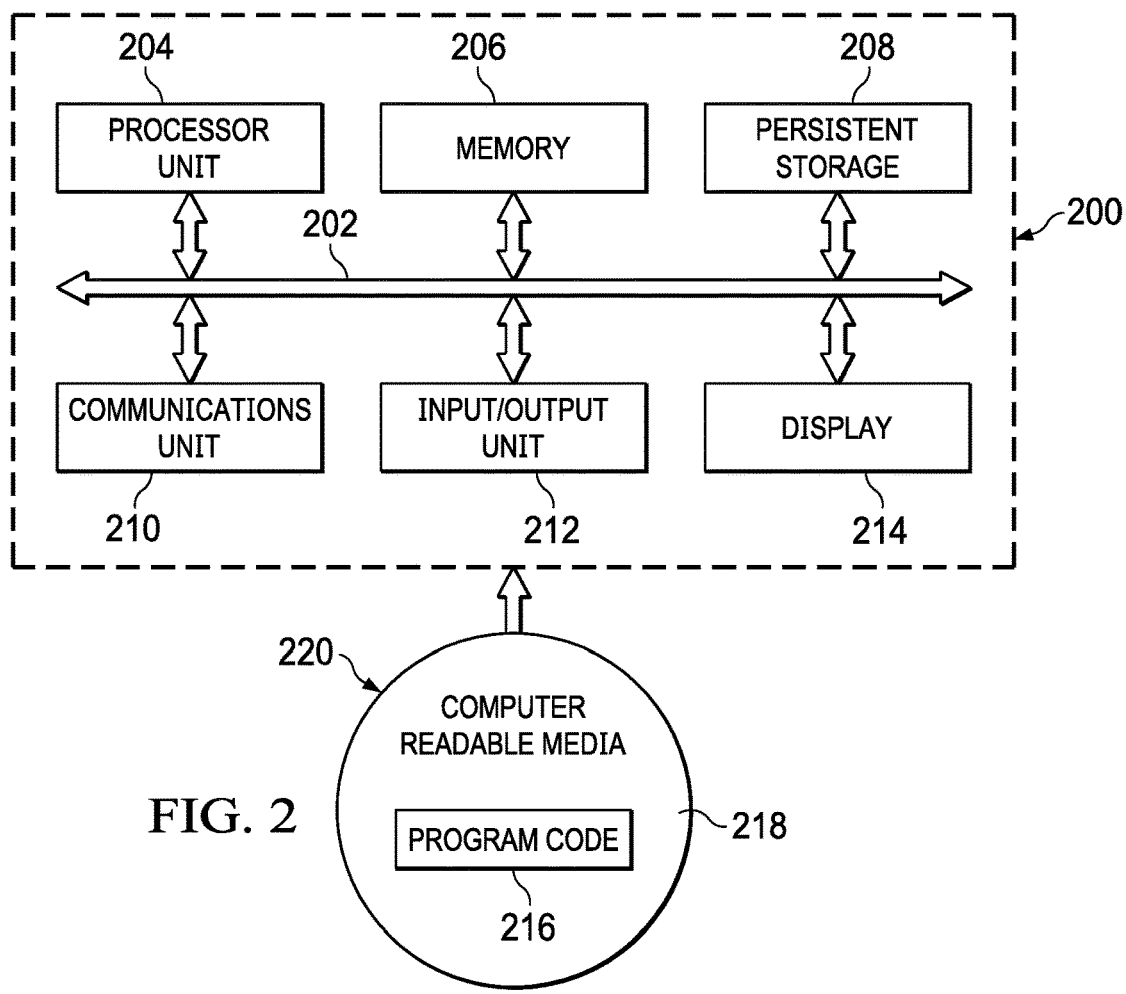
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides the clients data, such as boot files, operating system images, and applications. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Key Management Interoperability Protocol (KMIP)

Figure 3:
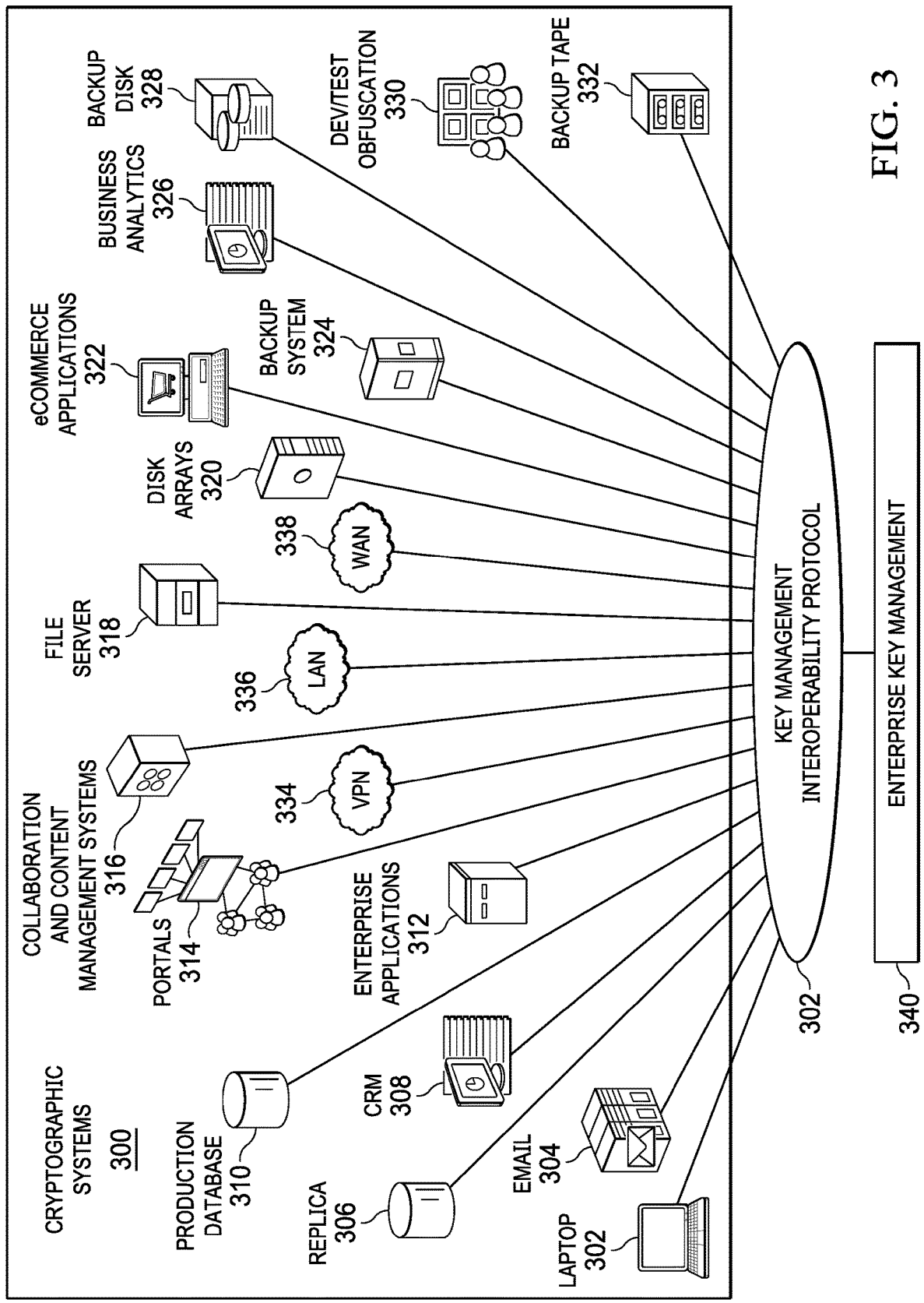
FIG. 3 is a representative enterprise environment in which the Key Management Interoperability Protocol (KMIP) is implemented.

As described above, the Key Management Interoperability Protocol (KMIP) enables key lifecycle management by defining a protocol for encryption client and key management server communication. Key lifecycle operations supported by the protocol include generation, submission, retrieval and deletion of cryptographic keys. Generally, KMIP enables cryptographic clients to communicate via a single protocol to all enterprise key management servers supporting that protocol. FIG. 3 illustrates an operating environment 300 in which the Key Management Interoperability Protocol 302 is implemented to facilitate key lifecycle management in this manner. As seen in FIG. 3, the environment may be quite varied and typically includes various systems, networks, devices, applications and other resources, each of which may rely in some manner upon encryption keys. Representative enterprise elements include, without limitation, staging systems 302, email systems 304, replica storage 306, customer relationship management (CRM) systems 308, production databases 310, enterprise applications 312, portals 314, collaboration and content management systems 316, file servers 318, disk arrays 320, electronic commerce applications 322, backup systems 324, business analytics systems 326, backup disks 328, development/test systems 330, and backup tape systems 332. Data is communicated among the systems and devices over VPN 334, LAN 336, WAN 338, and other networks (not shown).

To facilitate key management, an illustrative, but non-limiting enterprise embodiment implements a key management solution 340, such as IBM® Security Key Lifecycle Manager, which in a known commercial product that executes in an application server/database server operating environment, such as on IBM WebSphere® Application Server, and DB2®. This solution is sometimes referred to herein as SKLM. The application server typically runs a Java virtual machine, providing a runtime environment for application code. The application server may also provide other services, such as communication security, logging, and Web services. The database server provides a relational database.

The key management solution 340 may be implemented within the network shown in FIG. 1 using one or more machines configured as shown in FIG. 2. An enterprise key management solution of this type enables KMIP communication with clients (such as one or more the systems illustrated) for key management operations on cryptographic material. The material includes, without limitation, symmetric and asymmetric keys, certificates, and templates used to create and control their use. The key management server 340 listens for connection requests from KMIP clients that send requests to locate, store, and manage cryptographic material on the server. Using the server 340, the enterprise manages the lifecycle of the keys and certificates. Thus, for example, among other functions, the server enables basic key serving, such as definition and serving of keys, definition of keys or groups of keys that can be associated with a device, and the like, as well as auditing functions. In a typical scenario, the server supports KMIP secret data and symmetric key interoperability profiles for KMIP server and client interactions. The server provides KMIP information, such as whether KMIP ports and timeout settings are configured, current KMIP certificate (indicating which certificate is in use for secure server or server/client communication), whether SSL/KMIP or SSL is specified for secure communication, and so forth. The server may also provide updating KMIP attributes for keys and certificates. The server 340 serves keys at the time of use to allow for centralized storage of key material in a secure location. It also includes a graphical user interface (or, in the alternative, a command line or other programmatic interface) by which administrators (or other permitted entities) centrally create, import, distribute, back up, archive and manage the lifecycle of keys and certificates. Using the interface, administrators can group devices into separate domains, defines roles and permissions, and the like. By default, typically, groups of devices only have access to encryption keys defined within their group. These role-based access control features enable separation of duties, mapping of permissions for what actions against which objects, and enforcement of data isolation and security in a multi-tenancy environment. This also enhances security of sensitive key management operations.

In operation, the management server assists encryption-enabled devices in generating, protecting, storing, and maintaining encryption keys that are used to encrypt and decrypt information that is written to and read from devices. The key management server acts as a background process waiting for key generation or key retrieval requests sent to it through a TCP/IP communication path between itself and various devices, such as a tape library, a tape controller, a tape subsystem, a device driver, or a tape drive, a disk controller, a network switch, a smart meter, and others. These are merely representative cryptographic client devices. When a client writes encrypted data, it first requests an encryption key from the key management server.

As noted above, KMIP standardizes communication between cryptographic clients that need to consume keys and the key management systems that create and manage those keys. It is a low-level protocol that is used to request and deliver keys between any key manager and any cryptographic client. KMIP uses the key lifecycle specified in NIST SP800-57 to define attributes related to key states. Network security mechanisms, such as SSL/TLS and HTTPS, are used to establish authenticated communication between the key management system and the cryptographic client.

Figure 4:
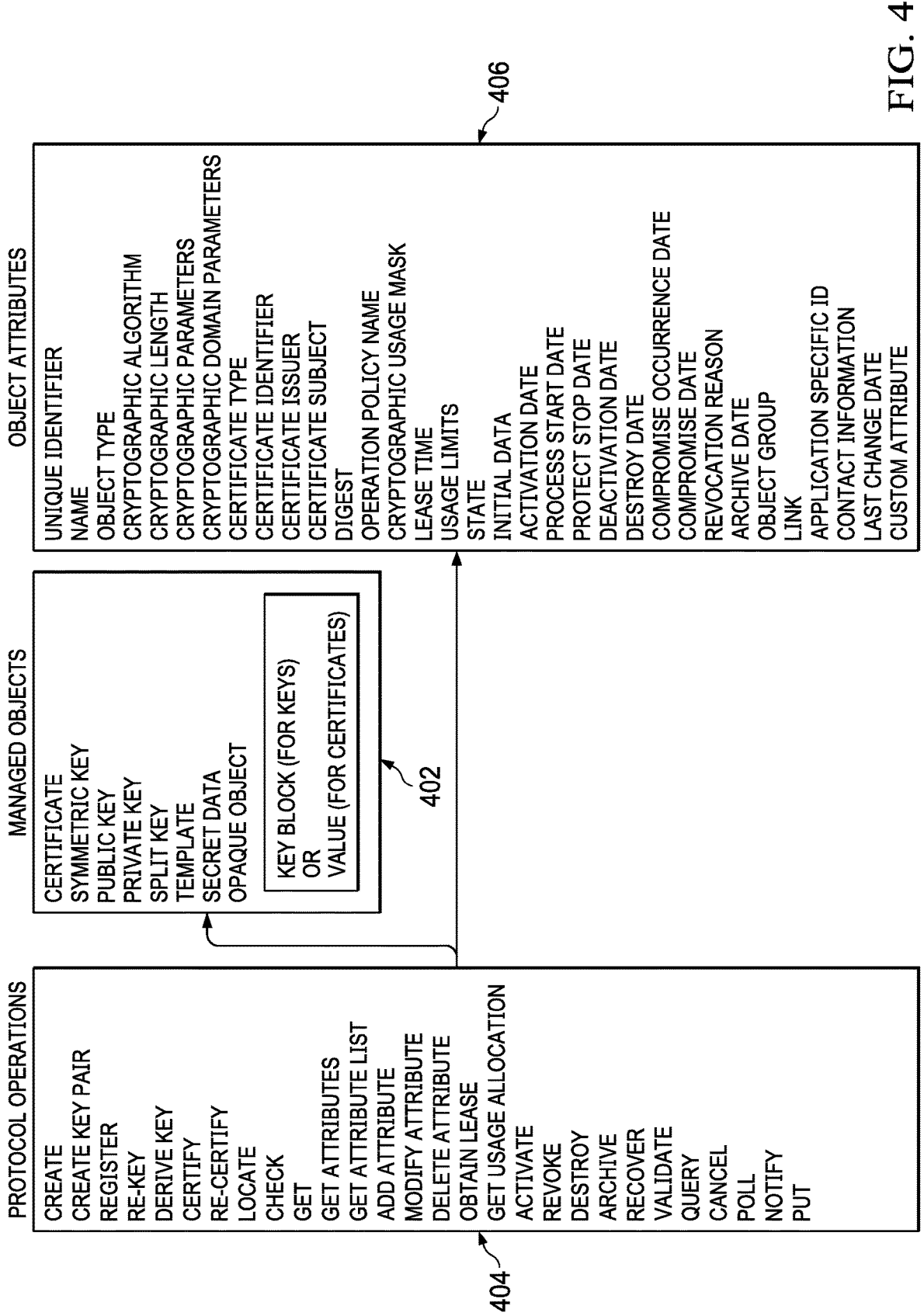
FIG. 4 illustrates the basic elements of the KMIP protocol.

As represented in FIG. 4, KMIP includes three primary elements: objects 402, operations 404, and attributes 406. Objects 402 are the cryptographic material (e.g., symmetric keys, asymmetric keys, digital certificates and so on) upon which operations 404 are performed. Operations 404 are the actions taken with respect to the objects, such as getting an object from a key management system, modifying attributes of an object and so on. Attributes 406 are the properties of the object, such as the kind of object it is, the unique identifier for the object, and so on. These include key length, algorithm, algorithm name, and the like. KMIP also envisions so-called "custom attributes" that can be used for vendor-specific support. Thus, for example, a custom attribute may be a client-side custom attribute, and the KMIP server that receives this value stores and retrieves it as necessary without attempting to interpret it. A custom attribute may also be a vendor-specific server attribute for use by the key management server.

FIG. 5 illustrates the contents and format for a KMIP message. Protocol messages consist of requests and responses, each message 500 including a header 502, and one or more batch items 504 with operation payloads and message extensions.

Figure 6A:
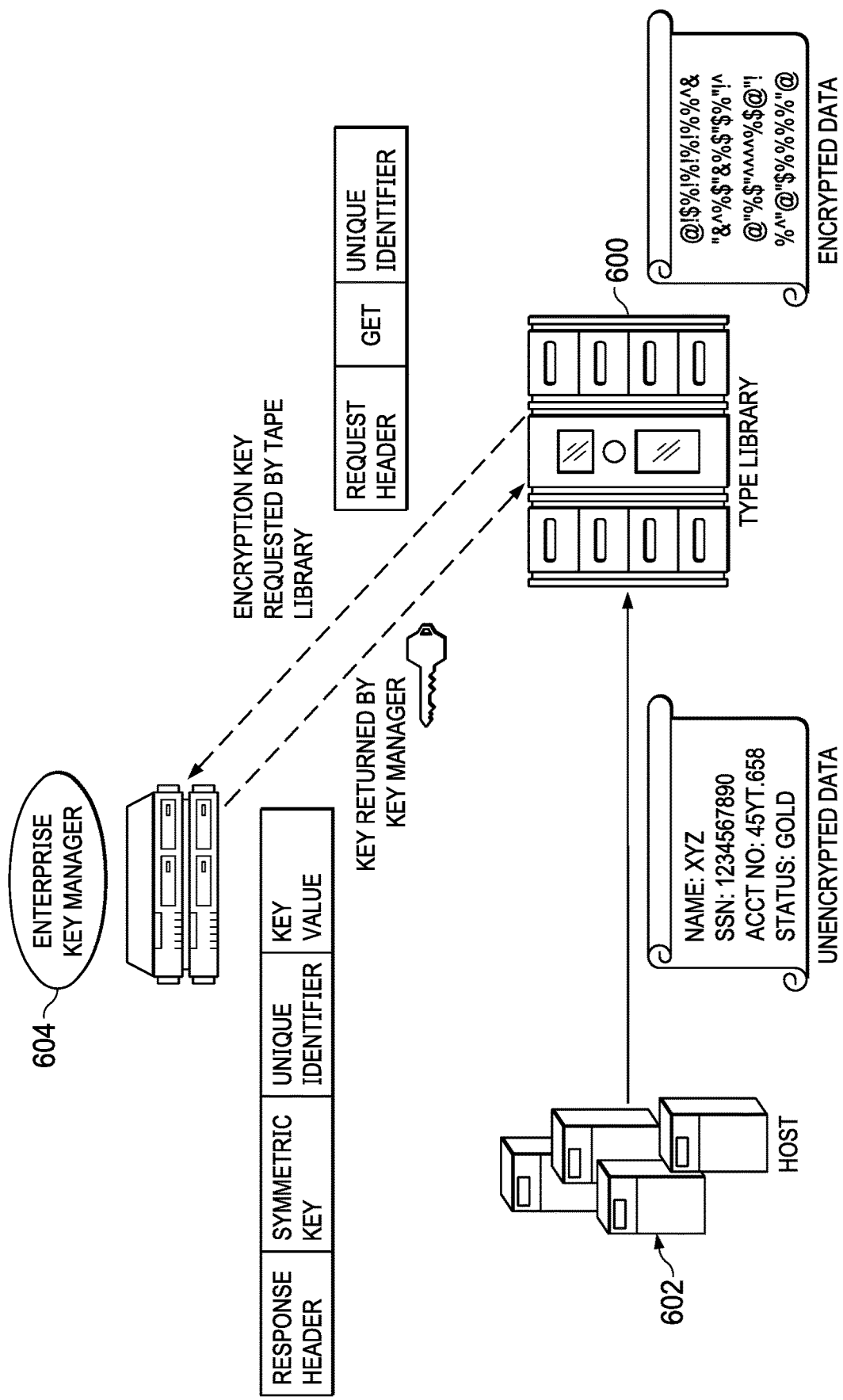
FIG. 6A illustrates a simple KMIP request/response model.
Figure 6B:
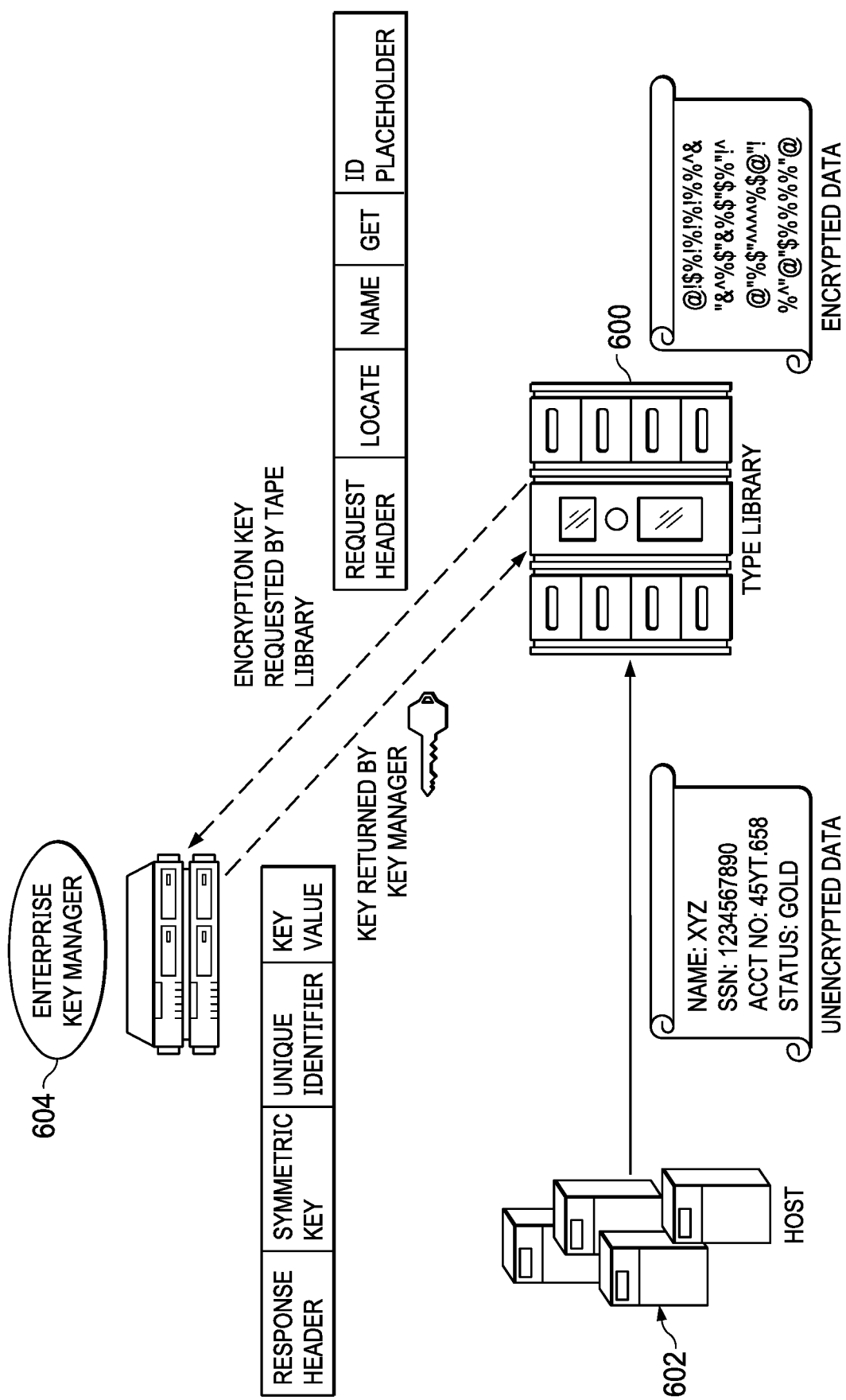
FIG. 6B illustrates the KMIP request/response model of FIG. 6A supporting multiple operations per request.

FIG. 6A illustrates how these elements work within the KMIP context. FIG. 5 also illustrates how KMIP defines a standard message format for exchanging cryptographic objects between enterprise key managers and cryptographic clients. In this example, a tape library 600 with encrypting tape drives has received information from a host system 602 in plaintext form. That information is to be encrypted when written to tape. The tape system 600 sends a request to a key management system 604 for a "Get" operation, passing a unique identifier for a cryptographic object, e.g., a symmetric encryption key, for the encrypting operation. The key management system 604 returns attributes for that object, including not only the value for that key, but also other attributes, such as the kind of key (symmetric) and the unique identifier, that allow the storage system to be sure it is receiving the correct key. Headers for both the request and response provide information, such as the protocol version and message identifiers, that the participating systems can use to track and correlate the messages. FIG. 6B is a similar example showing how the KMIP messages may support multiple operations within a single message. In this example, the tape system 600 requests the key management system 604 to use a "Locate" operation to find a key based on a "name" attribute. Once the system 604 has located the key, it then uses the unique identifier attribute for that key, indicated in the request message by the "id placeholder" attribute, to retrieve the key, assemble a response message and return the response to the tape system 600.

As seen in FIG. 4, KMIP objects are varied and include Certificate (a digital certificate), Opaque Object (an object stored by a key management server, but not necessarily interpreted by it), Private Key (the private portion of an asymmetric key pair), Public Key (the public portion of an asymmetric key pair, Secret Data (a shared secret that is not a key or certificate), Split Key (a secret, usually a symmetric key or private key, which is split into a number of parts, which are then distributed to key holders), Symmetric Key (a symmetric key encryption key or message authentication code (MAC) key), and Template (a stored, named list of KMIP attributes).

As the above examples illustrate, in the context of a KMIP-compliant implementation, when a cryptographic client in an encryption environment sends a request to the key management server, it identifies an object and an "operation" on that object. For example, the operation may be a request for a new key or retrieval of an existing key. As seen in FIG. 4, typical operations initiated by a cryptographic client and directed to the key management server include Activate (a request to activate an object), Add Attribute (a request to add a new attribute to an object and set the attribute value), Archive (a request that an object be placed in archive storage), Check (a request to check for the use of an object according to specified attributes), Create (a request to generate a key), Create Key Pair (a request to generate a new public/private key pair), Delete Attribute (a request to delete an attribute for an object), Derive Key (a request to derive a symmetric key), Destroy (a request to destroy key material for an object), Get (a request to return an object, which is specified in the request by a Unique Identifier attribute), Get Attributes (a request for one or more attributes of an object), Get Attributes List (a request of a list of the attribute names associated with the object), Get Usage Allocation (a request of the allocation from a current Usage Limits values for an object), Locate (a request to search for one or more objects, specified by one or more attributes), Modify Attribute (a request to modify the value of an existing attribute), Obtain Lease (a request to obtain a new Lease Time for a specified object), Query (a request to determine capabilities and/or protocol mechanisms), Recover (a request to access an object that has been placed in the archive via the Archive Operation), Register (a request to register an object), Re-key (a request to generate a replacement key for an existing symmetric key), and Revoke (a request to revoke an object). Certificate-specific operations include Certify (a request for a new certificate for a public key or renewal of an existing certificate with a new key), Re-certify (a request to renew an existing certificate with the same key pair), and Validate (a request to validate a certificate chain). Server-initiated operations include Notify (used to notify a client of events) and Put (used to push to clients managed cryptographic objects).

KMIP attributes are sent from the client to the key management server, or are returned from the server to the client. Attributes contain an object's metadata, such as its Unique Identifier, State, and the like (as will be delineated below). Some attributes describe what an object is, some attributes describe how to use the object, and some other attributes describe other features of the object. As the above examples show, attributes can be searched with the Locate operation. As will be described, some attributes are set with specific values at object creation, depending on the object type. Some attributes are implicitly set by certain operations. Other attributes can be explicitly set by clients. Some attributes, once set, cannot be added or later modified or deleted. And, some attributes can have multiple values (or instances) organized by indices.

A core set of attributes are specified for all objects, while object-specific attributes may be specified as needed.

As seen in FIG. 4, the KMIP attributes include the following: Activation Time (the date and time when the object may begin to be used), Application Specific Identification (the intended use of a Managed Object), Archive Date (the date and time when the object was placed in archival storage), Certificate Issuer (an identification of a certificate, containing Issuer Distinguished Name and the Certificate Serial Number), Certificate Subject (the certificate subject, containing the Certificate Distinguished Name), Certificate Type (the type of certificate, such as X.509), Compromise Occurrence Date (the date and time when an object was first believed to be compromised), Compromise Date (the date and time when an object is entered into a compromise state), Contact Information (the name of the entity to contact regarding state changes or other operations for the object), Cryptographic Algorithm (the algorithm used by the object, such as RSA, DSA, DES, etc.), Cryptographic Length (the bit length of the cryptographic key material of the object), Cryptographic Parameters (a set of optional fields that describe certain cryptographic parameters to be used when performing cryptographic operations using the object, such as hashing algorithm), Cryptographic Usage Mask (a bit mask that defines which cryptographic functions may be performed using the key), Custom Attribute (user-defined attribute intended for vendor-specific purposes), Deactivation Date (the date and time when the object may no longer be used for any purpose), Destroy Date (the date and time when the object when the object was destroyed), Digest (a digest of the key (digest of the Key Material), certificate (digest of the Certificate Value), or opaque object (digest of the Opaque Data Value), Initial Date (the date and time when the object was first created or registered), Last Changed Date (the date and time of the last change to the contents or attributes of the specified object), Lease Time (the time interval during a client should use the object), Link (a link from an object to another, closely related object), Name (a descriptor for the object, assigned by the client to identify and locate the object), Object Group (the name of a group to which the object belongs), Object Type (the type of object, such as public key, private key, or symmetric key), Operation Policy Name (an indication of what entities may perform which key management operations on the object), Owner (the name of the entity that is responsible for creating the object), Process Start Date (the date and time when an object may begin to be used for process purposes), Protect Stop Date (the date and time when the object may no longer be used for protect purposes), Revocation Reason (an indication why the object was revoked), State (the state of an object as known to the key management system), Unique identifier (a value generated by the key management system to uniquely identify the object), and Usage Limits (a mechanism for limiting the usage of the object).

A custom attribute whose name starts with a certain value (i.e. x-) is a client-side custom attribute, and KMIP server stores and retrieves it as necessary, without attempting to interpret it. A custom attribute whose name starts with another certain value (i.e. y-) is a vendor-specific server attribute for the server's use.

Extended Credential Type to Group KMIP Clients

As has been described above, KMIP has been extended to provide an extended credential type to pass sufficient information from cryptographic clients to the key management server to enable the server to deduce appropriate pre-provisioned cryptographic materials for the individual clients. The custom credential type (and, in particular, the information passed therein) enables the client to pass sufficient information to the key management server so that the server can determine the type of device that is requesting resources and thus return materials appropriate for that type of device. Typically, the credential information is passed as one or more values in a header of the KMIP request that flows from the client to the server, although an alternative approach is to pass the information in a message extension area particular to each request in a batch of requests.

The extended credential leverages the existing KMIP custom attribute. FIG. 7 illustrates an extended credential type 700. The credential type preferably comprises a set of fields, some of which are required, and others that are optional. These fields are now described with reference to FIG. 7. The data structure typically follows the Tag-Type-Length-Value encoding scheme that KMIP uses to transfer data. It includes a set of extended tag values that are shown in FIG. 7. These values include a required "device serial number," which is used as the identifier of the device in the key management server and must be unique within a given server. Preferably, this value can be up to 48 characters, and it may contain alphanumeric, period, space, dash, semicolon, and underscore characters with no leading or trailing spaces. This field must always be filled in. The "device group" field identifies the device groups that will be associated with this device when it is added, and it is a required field if the device is attempting dynamic registration with the server (if the device's group is already known to the server, this field is optional). This field should only contain printable characters with no asterisks and leading or trailing blanks. It may be up to 16 characters long and is NULL terminated. The "device text" field includes text to be associated with the device when the device is registered with the key management server. This field is only used when the device is registered. Any other time, this field is not used by the key management server; thus, the field is optional. This field should only contain printable characters with no asterisks and leading or trailing blanks. This value must also be unique within the key management server. The "machine identifier" field is an identifier of the machine (machine ID) and may be up to 48 characters long and is NULL terminated. It may contain any printable characters, but no asterisks. If this field is present in the data structure, the "worldwide name" and "media identifier" (described below) are not used. The "media identifier" field includes a media identifier (media ID), and it may be up to 12 characters long, and is NULL terminated. It should contain only a hex string and must only contain characters 0-9 and A-F. The "worldwide name" must be up to 8 characters long, and it is expected to be byte data and not printable. The "machine text" field includes text to be associated with the machine ID, when the device is registered with the key management server. This field is only used when the device is registered. Any other time, this field is not used by the server; thus, it is also optional. This field should only contain printable characters with no asterisks and leading or trailing blanks. This value must be unique within the particular key management server. In the above description, each extended tag value is identified by a character name ("char"), which is a single 8-bit value, although all strings in the extended credential are UTF-*8 strings.

The above-identified fields and their field values (required and/or optional) comprise a data structure or, more generally, a set of data comprising the extended credential. Preferably, and as has been described, the credential object is wrapped inside an octet stream envelope that conforms to the KMIP Tag-Type-Length-Value (TTLV) encoding scheme.

FIG. 8 illustrates an example KMIP request 800 that includes the extended credential described above. In this example, and as can be seen, the request header 802 includes a set of values including the Credential, Credential Type (in this case representing the extended credential type as described), and the Credential Value itself. The Credential Value 803 is a concatenated string corresponding to the values of the individual fields that have been described above, and these values include the device identifier, and the device group. In this example, which is merely representative, the body 804 of the KMIP request 800 includes two (2) consecutive operations (a revoke operation, and then a destroy operation) that are carried out under the authorization of the credentials provided. Based on the credential value (and the information encoded therein, as has been described), the key management server associates this particular batch of requests with a particular device type. This enables the key management server to connect the KMIP request to appropriate pre-provisioned cryptographic materials for particular devices or device groups. The KMIP server may make additional validity checks to ensure the authenticity of this batch of requests, but such checks are outside the scope of this disclosure.

Figure 9:
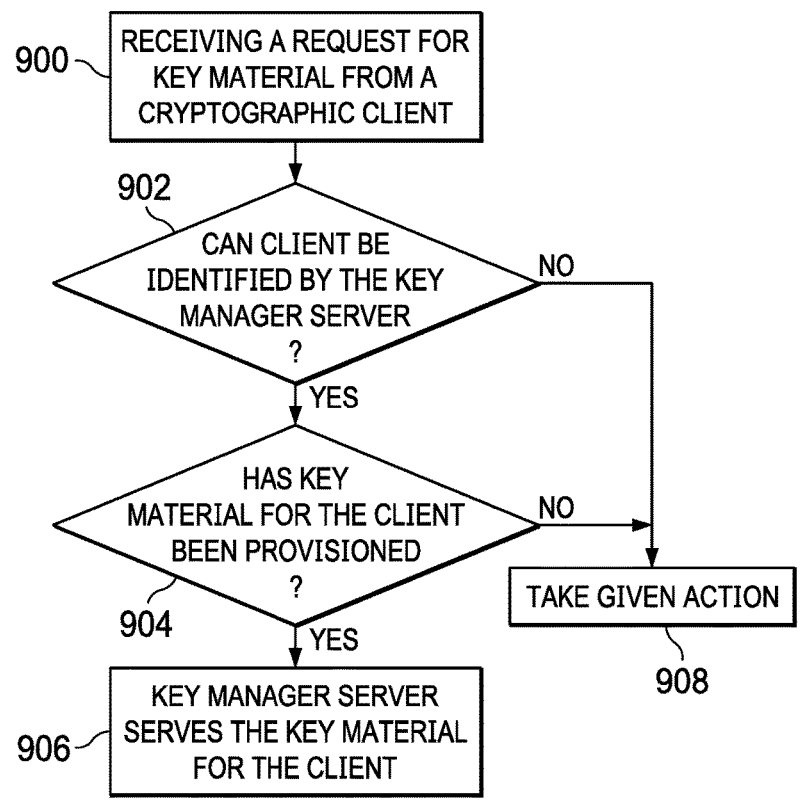
FIG. 9 is a key management server side process flow illustrating how the KMIP request is processed by the key management server in a representative embodiment.

FIG. 9 is a process flow illustrating how the above-described KMIP request is processed by the key management server. This method is used to process device type information in a client-side certificate authentication process. It begins at step 900 upon the key management server receiving a client request for key material. The key material typically identifies a device type. Preferably, a plurality of devices having a same device type typically share a pool of the key material. Typically, the client request includes a client-side certificate and a custom credential distinct from the certificate. The client-side certificate is used to authenticate the client, and the custom credential is used to identify the client and to determine whether key material for the client has been provisioned. At step 902, a test is performed to determine if the client can be identified. If so, a test is performed at step 904 to determine if the key material for the client has been provisioned. If the result of the test at 904 is positive (namely, that the client has been identified and the key material for the client has been provisioned), routine continues at step 906 with the key material being served by the key management server. If, however, the custom credential fails to identify the client (the outcome of step 902 is negative), or if the key material has not been provisioned (the outcome of the step 904 is negative), a given action is taken. This is step 908. The given action may be refusing the client request, placing the client request in a queue for administrator review, or the like.

Creating Credential Dynamically for KMIP

With the above as background, the technique of this disclosure is now described. In this approach, a solution of the type described above is extended further to provide for a new credential type that enables an initiating (first) client device to create a credential dynamically (namely, "on-the-fly") and that can then be selectively shared with and used by other (second) client devices. Using a dynamically-created credential of this type, the other (second) devices are able to fetch the same key material (one or more keys) configured by the initiating (first) device. In this manner, multiple devices are able to create and share one or more keys among themselves dynamically, and on as-needed basis without requiring a human administrator (e.g. a key management system admin) to create a credential for a device group in advance of its usage. Prior to the technique herein, an administrator would have to create the credential and have it instantiated by the KMIP solution central server, and individual client devices would then have to interact with the server to use that credential.

Figure 10:
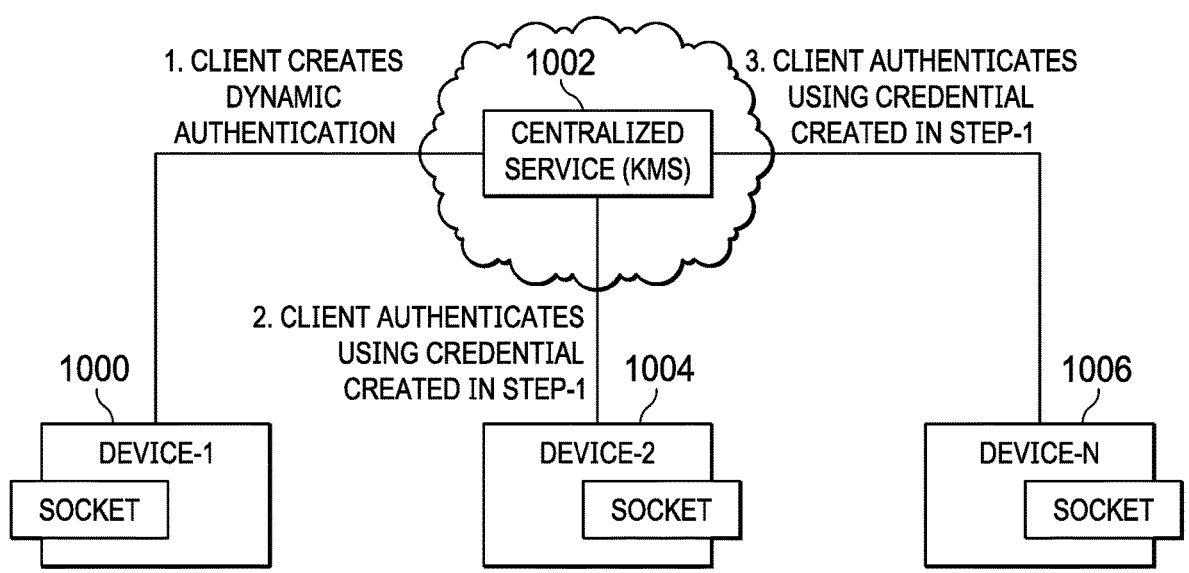
FIG. 10 depicts the technique of this disclosure whereby a KMIP client configures a device group dynamically, and the key created is shared among other devices.

As depicted in FIG. 10, and in lieu of having an administrator configuring the credential(s) in advance, according to this disclosure a first client device 1000 interacts with the central key management server (KMS) 1002 dynamically, i.e., as needed, to create a credential or credential(s). As described above, and taking KMIP as a representative implementation, the first client device communicates a credential request, typically in the header of the KMIP request. As described above with respect to FIG. 9, and if the client can be identified, the key management server 1002 responds by creating the new credential. As compared to the FIG. 9 embodiment, however, the server 1002 in this case provisions the key material (one or more keys) for the first client device 1000 upon receipt of the request (step (1)), and not before. Thereafter, one or more additional (second) client devices 1004, 1006, interact with the central server 1002 (at steps (2) and (3)) to authenticate against the credential or credential(s) created by the first device and server interaction (at step (1)). In particular, the client devices 1004 and/or 1006 make credential request(s) to the server, once again preferably passed in the KMIP request header. These requests made be made at different time(s). The KMS server 1002 responds to the requests (seeking authentication) by using the key material previously generated for the first client device. In this manner, and assuming the KMS server has established the necessary trust among the participating devices, the devices 1002, 1004 and 1006 share the credential and thus the same key (or keys).

Theoretically, any client in this group is able to create, modify, and/or delete keys that are then useful by other group members, however, in practice preferably just a pair of the client devices (a so-called Owner and Partner as described below) provide this functionality.

A representative KMS server as depicted in FIG. 10 is IBM® Security Key Lifecycle Manager or, as noted, SKLM for short, although this is not a limitation.

In one embodiment, the technique depicted in FIG. 10 and described above is facilitated by providing a new key management protocol device group, referred to herein for convenience as PEER_TO_PEER (P2P). The device group (as noted above sometimes also referred to as an "extended" device group) is configured to support devices that operate using KMIP, all as described in detail above. With respect to this device group, and in the description that follows below for this embodiment, just a pair of devices are allowed to manage the keys. A device that manages the keys is sometimes referred to herein as a "member" of the P2P system-defined group or any of its extended groups. In this context, in the basic device group model for P2P and its extended device group, preferably at most two (2) devices are members of the group at any given time, and—as such—only these devices manage symmetric keys for that group (although multiple actual devices may benefit from the key material established). Member devices have a valid SSL/TLS communication certificate also trusted by the server. Preferably, the devices are mapped to their certificates through a unique worldwide node name (WWNN) that is specified in the certificate's Subject Alternative Name (SAN). In addition, those certificates preferably also are signed by SKLM's Trusted CA; in the alternative, the CA certificate of the device certificate is added in SKLM's trust store before initiating the communication.

As will be described, during creation of the extended PEER_TO_PEER device group, preferably through KMIP Create requests, the device sending the create request is set as an Owner of the group, and the device added through a subsequent KMIP Locate/Get/Query request is set as the Partner. As noted, and in this embodiment, each device group has a maximum one set of Owner and Partner members.

The following describes operation(s) on the P2P extended device group. In one embodiment, an administrator consumes the extended device group directly by adding devices and creating keys. An alternative, preferred approach is to consume the group by an extending operation, which is now described. To this end, the server preferably provides two (2) ways to extend the PEER_TO_PEER device group, one through a Graphical User Interface (GUI), and the second preferred approach through use of extended KMIP credentials. Both of these operations are now described.

Extending the P2P device through the server GUI begins as follows. The authorized user logs into the server console. The user then navigates to Advanced Configuration→Device Group and clicks on a Create button and select "Two devices and many symmetric keys (PEER_TO_PEER)" option. A device group name is entered in a textbox, and the user clicks Create to create the extended PEER_TO_PEER device group. The user can then navigate to a Welcome page of the server under a Key and Device Management tab to view the newly-created device group.

The following steps are then used to add a device to PEER_TO_PEER or its extended device group. In particular, the user logs into the server console, and he or she then selects the PEER_TO_PEER or its extended device group from the list of device groups visible in the Key and Device Management tab. The user then right clicks and selects "Manage key and devices." The system then navigates to that specific device group management page. The user selects Click Add→Device, and provides a name to the device certificate, which name is then used as an alias in database store. The user then selects a path to the certificate file, and selects device type as "Owner" or "Partner." If the certificate has the same WWNN name as in the SAN, then the system adds the device in this device group.

After a certain time, the device certificate may expire and thus needs to be updated. Preferably, only the certificate having the same WWNN with the one that is expired is allowed to modify the certificate. The following are the steps that are then used to modify the certificate. In particular, the user logs into the server console, selects PEER_TO_PEER or its extended device group from the list of device groups visible in Key and Device Management, and right clicks on Manage key and devices. The specific device group management page is then displayed. The user then selects the device whose certificate needs to be updated and selects Modify. The user then browses through the new certificate file, selects one, and then selects the Modify operation.

As is evident, adding devices in PEER_TO_PEER or its extended device group through the server GUI is a manual activity. Typically, and when done manually, there are no restrictions regarding the order in which Owner or Partner can be added. During manual device addition operation, any valid certificate with WWNN can be added as device certificate. Therefore, if the administrator tries to add the Partner's device manually after creating device group dynamically through KMIP, then WWNN of the Partner's device—which was set during device group creation—is not validated.

The following describes extending the PEER_TO_PEER device group and adding devices through KMIP. This is a preferred approach. Preferably, the server (such as server 1002 in FIG. 10) is a KMIP 1.4-compliant server. As noted above, the PEER_TO_PEER device group is specifically modeled around KMIP devices. According to this disclosure, the server extends standard KMIP authentication credential configuration to allow the client devices to create extended PEER_TO_PEER device groups dynamically through KMIP requests.

To this end, the extended credential type (FIG. 7) is further extended to include the following representative tag:
define TAG DEVICE METADATA DEVICE GROUP FAMILY 0x54000A With reference to FIG. 7, the device metadata (0x540001), the device metadata version (0x540002), and the device metadata device group (0x540004) tags are mandatory for the routine KMIP operations in the device group. The device metadata worldwide name (0x540008) and the new device metadata device group family (0x54000A) tags are only required when creating the extended PEER_TO_PEER device group through KMIP requests per this disclosure. As noted above, the values for the tags are encoded in the TTLV format hex data strings. For example, the value "PEER_TO_PEER" in tag 0x54000A may be sent as "54000A07000000 00504 . . . 00." In this approach, a KMIP Create Request for Symmetric Key having all the credentials required for device group creation creates an extended PEER_TO_PEER device group along with creating a symmetric key in that group. To add a device as "Partner" in an already created device group, a KMIP Get/Locate/Query for Symmetric Key request is used; this request has the device group (0x540004) and device metadata device group family (0x54000A) tags.

The following use case examples provide a further elaboration concerning the KMIP request-response and required authentication credentials to create the extended PEER_TO_PEER device group.

To create an extended PEER_TO_PEER device group (named, for example, as "P2P_EXT"), a set of mandatory tags then is added (e.g., in an Authentication Credentials database) for device group, device group family, and the tag corresponding to the Partner's WWNN number. The device group tag (0x540004) has a value corresponding to the device group (P2P_EXT), the device group family tag (0x54000A) has a value corresponding to the PEER_TO_P-EER device group, and the WWNN tag (0x540008 (device group) has the value corresponding to the Partner's WWNN number. FIG. 11 depicts a representative KMIP request to create this device group that is sent by the client to the server, and FIG. 12 depicts the KMIP response that is returned by the server when the server processes the KMIP request successfully. In particular, these operations create a device group with the name P2P_EXT, add the requesting client as the Owner device member, and creates a symmetric key in the newly-created device group.

Adding a Partner device to the newly-created device group P2P_EXT then proceeds as follows. In particular, a set of mandatory tags is added in the Authentication Credentials database. These are the device group tag (0x540004) value and device group family tag value. Given these values, FIG. 13 depicts a representative KMIP Locate request, which includes the required device group credentials. The same credentials can be sent with the KMIP Get or KMIP Query operations. As noted above, however, preferably the client that sends the Locate request is one that has a valid SSL/TLS communication certificate also trusted by the server. If the requesting client has the same WWNN as set by the Owner during the device group creation, then this request is serviced successfully after the requesting client (the second one that sends the Locate request) is added as a Partner member in the group. FIG. 14 depicts a representative response to the KMIP Locate request that is then returned from the server in this circumstance. In this embodiment, preferably only Partner type devices are added through the KMIP add device requests, although this is not necessarily a limitation.

To add an Owner device in an empty device group (named, e.g., P2P_UI_EXT) through a KMIP request, the KMIP client sends the same KMIP Create request (e.g., as depicted in FIG. 11), but with the device group tag 0x540004 having value for the empty device group. In this case, and assuming the device group already exists, a new device group is not created. The WWNN from the requesting client's TLS communication certificate is read and added as the Owner's device in the authentication credentials database (and thereafter used to validate a Partner's add request).

To create a device group for a channel-to-channel communication, where WWNN for the Owner and the Partner is the same, the following operations are performed. The client sends a Create Device Group KMIP request (as in FIG. 11), wherein the WWNN in the credential is the same as the one in the client's TLS communication certificate. Here, a new device group is created and two devices, one the Owner, and the other the Partner, are added in the device group having the same WWNN. The same certificate is then used as Owner or Partner for any subsequent KMIP requests.

The following describes a routine KMIP operation on a managed object of any device group. These operations have the device group tag (0x540004) having the appropriate value, along with the version tags in the KMIP authentication request. FIG. 15 depicts a representation KMIP request. The response to this request is the same as depicted in FIG. 12, except that the device is not added. The server only serves the key if the requesting client is a member of the device group. An appropriate response is shown in FIG. 16.

The security settings for the PEER_TO_PEER device groups in the server preferably are managed as follows. If a first option (e.g., "Only accept manually-added certificates from communication") is enabled, then the server allows KMIP clients communicating the server-trusted certificate to be added directly into the PEER_TO_PEER extended device group during device group creation or addition requests. If a second option (e.g., "Hold new certificate requests pending approval") is enabled, however, then KMIP clients communicating server-trusted certificates are added to a pending accept list of client certificates; in this case, an administrator needs to accept the certificate (e.g., through the server GUI or CLI) to enable access too managed objects from device groups in subsequent requests. While creating a new extended PEER_TO_PEER device group through a KMIP request, preferably the policy set in a parent "PEER_TO_PEER" device group is enforced, because the target device group is non-existent at the time of request processing. Preferably, and to enable or disable the above-described functionality for dynamic creation of device group, the server administrator sets an appropriate property flag in a server configuration file.

The subject matter described herein has many advantages. The approach enables a KMIP-supported system to provide for dynamic creation of new credentials (a device group) for a client device, and allowing clients (partner devices) to share a single key dynamically for authentication. The technique enables a cryptographic client easy access to cryptographic materials, but without requiring pre-provisioning of cryptographic materials (e.g., by a human administrator or otherwise). The technique leverages an existing KMIP extension point without burdening a KMIP client with unmanageable PKI maintenance costs. The technique is simple to implement, as it uses the existing "credential" feature of KMIP. Another advantage is that the technique provides clients a simple way in which they can contribute materials of their own to the pool of materials for their device type/group.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques herein may be used with other key management protocols including, without limitation, IPP, PKCS #11, and proprietary protocols used for key management.

The scheme described herein and the key management server may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the extended credential functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the KMIP extended credential and its components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises client-side code to generate the above-described encoding.

The extended KMIP credential and its processing may be implemented as an adjunct or extension to an existing key lifecycle manager or other policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described the invention, what is now claimed is as follows.

The invention claimed is:

1. A method for authentication implemented in a key management server computing entity, comprising:
    extending a key management protocol to provide a credential type that enables a client-defined credential to be created dynamically;
    receiving a request to create a credential from a first client, the first client together with a second client being members of a device group, the request being configured using the credential type;

in response to receiving the request and authenticating the first client, dynamically creating a credential and provisioning key material for the device group;

receiving a subsequent request to authenticate against the credential from the second client; and in response to receiving the subsequent request and authenticating against the credential, enabling the second client to access and use the key material dynamically provisioned for the device group.

2. The method as described in claim 1 wherein the key management protocol is the Key Management Interoperability Protocol (KMIP).

3. The method as described in claim 2 wherein the request to create the credential from the first client is passed in a KMIP request header.

4. The method as described in claim 1 further including determining whether the second client has a valid communication certificate with the key management server and is therefore trusted prior to enabling the second client to access and use the key material.

5. The method as described in claim 1 wherein the key material is a cryptographic key.

6. The method as described in claim 1 wherein one or more additional clients are enabled access to the dynamically-provisioned key material but only the first client and the second client are enabled to manage the key material.

7. An apparatus configured as a key management server, comprising:

a processor;

computer memory holding computer program instructions executed by the processor the computer program instructions including program code configured to:

extend a key management protocol to provide a credential type that enables a client-defined credential to be created dynamically;

receive a request to create a credential from a first client, the first client together with a second client being members of a device group, the request being configured using the credential type;

in response to receiving the request and authenticating the first client, dynamically create a credential and provision key material for the device group;

receive a subsequent request to authenticate against the credential from the second client; and in response to receiving the subsequent request and authenticating against the credential, enable the second client to access and use the key material dynamically provisioned for the device group.

8. The apparatus as described in claim 7 wherein the key management protocol is the Key Management Interoperability Protocol (KMIP).

9. The apparatus as described in claim 8 wherein the request to create the credential from the first client is passed in a KMIP request header.

10. The apparatus as described in claim 7 wherein the computer program instructions are further configured to determine whether the second client has a valid communication certificate with the key management server and is therefore trusted prior to enabling the second client to access and use the key material.

11. The apparatus as described in claim 7 wherein the key material is a cryptographic key.

12. The apparatus as described in claim 7 wherein one or more additional clients are enabled access to the dynamically-provisioned key material but only the first client and the second client are enabled to manage the key material.

13. A computer program product in a non-transitory computer readable medium for use in a data processing system configured as a key management server, the computer program product holding computer program instructions that, when executed by the data processing system, are configured to:

extend a key management protocol to provide a credential type that enables a client-defined credential to be created dynamically;

receive a request to create a credential from a first client, the first client together with a second client being members of a device group, the request being configured using the credential type;

in response to receiving the request and authenticating the first client, dynamically create a credential and provision key material for the device group;

receive a subsequent request to authenticate against the credential from the second client; and in response to receiving the subsequent request and authenticating against the credential, enable the second client to access and use the key material dynamically provisioned for the device group.

14. The computer program product as described in claim 13 wherein the key management protocol is the Key Management Interoperability Protocol (KMIP).

15. The computer program product as described in claim 14 wherein the request to create the credential from the first client is passed in a KMIP request header.

16. The computer program product as described in claim 13 wherein the computer program instructions are further configured to determine whether the second client has a valid communication certificate with the key management server and is therefore trusted prior to enabling the second client to access and use the key material.

17. The computer program product as described in claim 13 wherein the key material is a cryptographic key.

18. The computer program product as described in claim 13 wherein one or more additional clients are enabled access to the dynamically-provisioned key material but only the first client and the second client are enabled to manage the key material.

* * * * *